Figure 1:
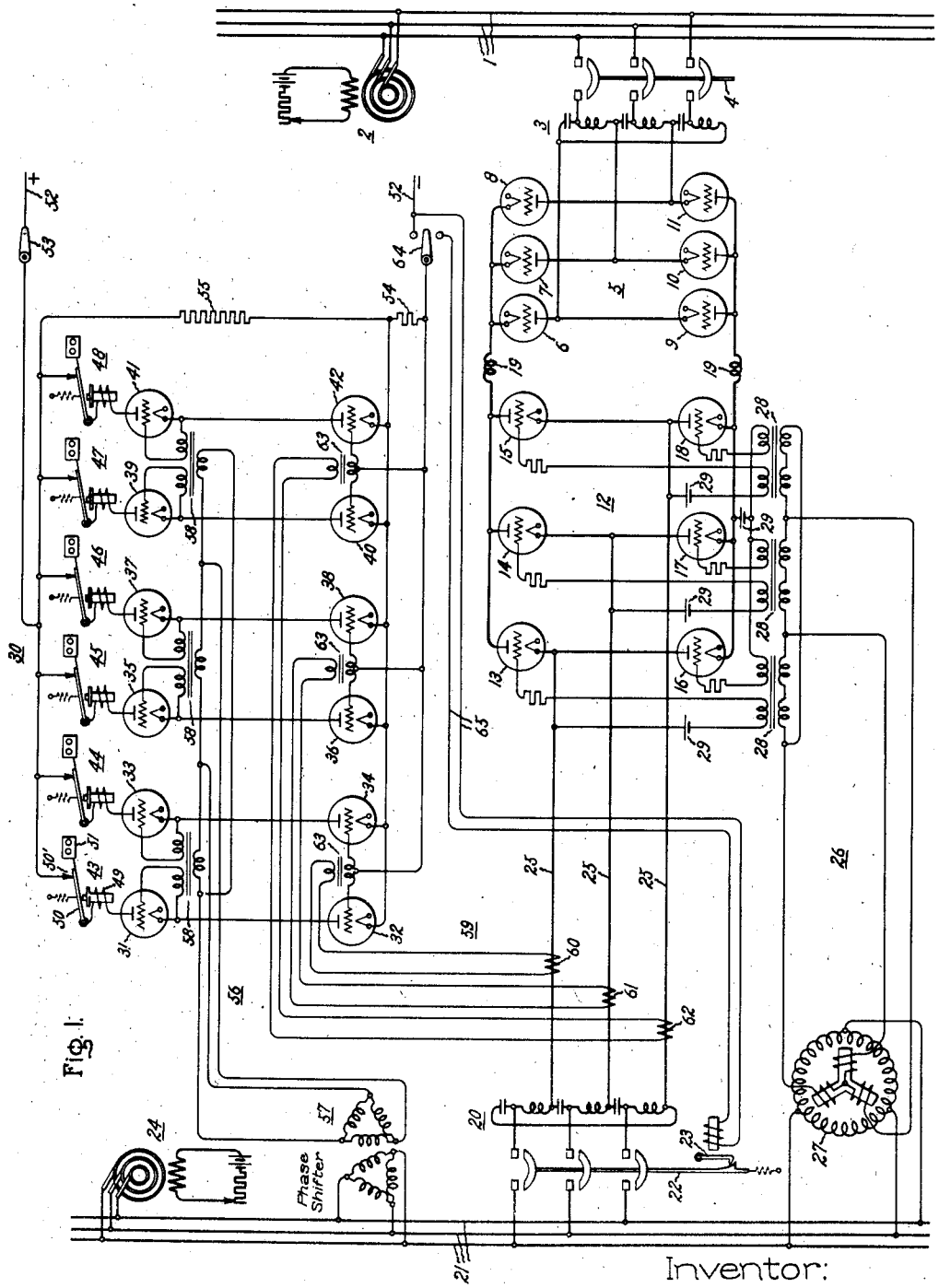

Sept. 20, 1938.   C. H. WILLIS   2,130,443
ELECTRIC CONTROL AND INDICATING SYSTEM
Filed Aug. 20, 1936   2 Sheets—Sheet 2
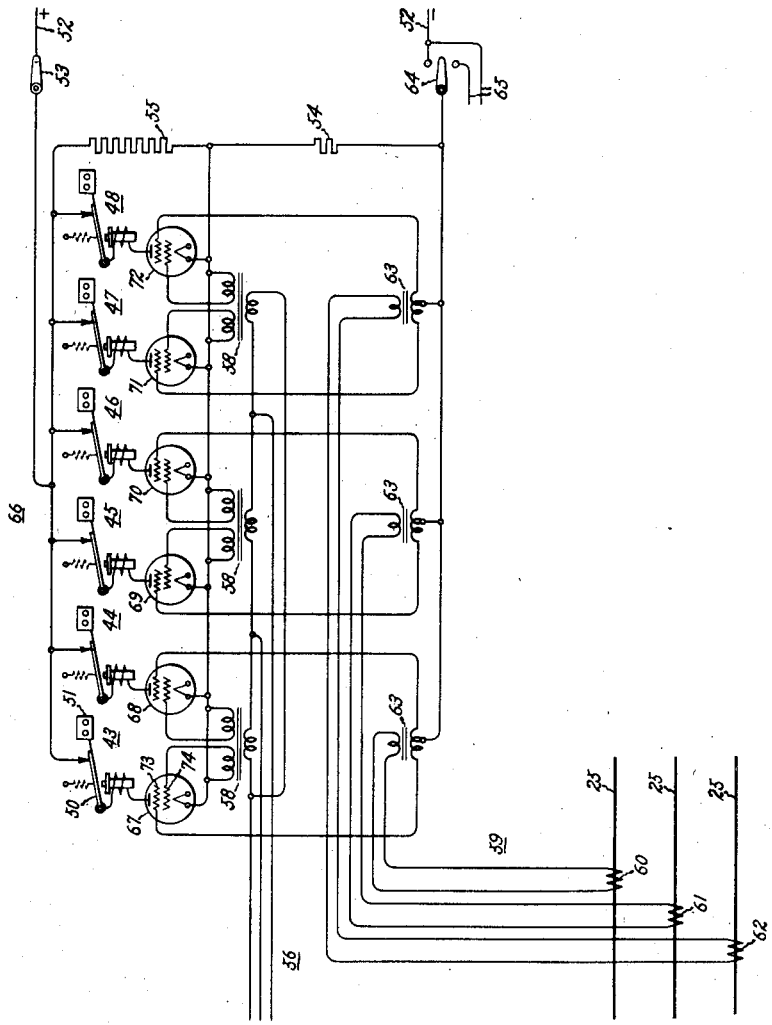
Inventor:
Clodius H Willis,
by Harry E. Dunham
His Attorney.

Patented Sept. 20, 1938

2,130,443

UNITED STATES PATENT OFFICE 2,130,443

ELECTRIC CONTROL AND INDICATING SYSTEM

Clodius H. Willis, Princeton, N. J., assignor to General Electric Company, a corporation of New York Application August 20, 1936, Serial No. 96,974

7 Claims. (Cl. 177—311)

My invention relates to electric circuits and more particularly to indicating and control systems for electric valve circuits.

In systems which employ mechanical or electrical devices which are intended to operate according to predetermined modes of operating conditions, it is frequently desirable to control the systems in response to deviations from these modes of operation or to provide electric signaling systems to afford an indication when the devices depart from the predetermined modes of operation. Where electric valves are employed in translating circuits there has been evidenced a decided need to provide indicating circuits to indicate the condition of operation of the translating circuits. Particularly in power systems where electrical energy is transmitted or transformed by means of electric valves, it is frequently desirable to provide indicating systems or control systems which are responsive to abnormal operation of the electric system to provide an indication in response to such irregular operation, or to control the system when the electric valves depart from a predetermined mode of operation. It is desirable that these control and indicating systems be inherently capable of precisely and accurately responding to predetermined operating conditions and it is also desirable that these circuits be readily adaptable to electric translating systems generally, without necessitating material change or alteration in the apparatus employed in the electric systems and without interfering with the manner in which the systems operate.

An object of my invention is to provide improved control and indicating systems for electric valve translating circuits which function in response to a departure from a predetermined mode or manner of operation of the translating circuit.

Another object of my invention is to provide control and indicating circuits for electric valve translating apparatus which function to control an associated circuit or to afford an indication when the electric valves of the translating circuit conduct at any time other than during predetermined intervals.

In accordance with the illustrated embodiments of my invention, I provide control and indicating systems for an electric valve translating circuit which operate to control the circuit or to afford an indication when the electric valves lose control, that is when the electric valves conduct current at any time other than during predetermined intervals established by a predetermined plan or mode of operation. In one embodiment of my invention, I employ a circuit including a plurality of pairs of serially-connected electric valves, each pair of valves being associated with one of the main power electric valves, to indicate the main power electric valve which is the first to conduct current at any time other than during the predetermined proper intervals of several valves so failing within a very short period. The conductivity of one of the control or indicating electric valves in each of the pairs is co-ordinated in time relationship with the main electric valves and the conductivity of the other electric valve of each pair is controlled in response to the current of the associated main electric valve or in accordance with an electrical quantity of an associated electric circuit so that any departure from normal operation effects energization of the control or indicating circuit. In another embodiment, control electric valves of the type having two control members are associated with the main power electric valves to indicate or control the apparatus in response to a departure from a predetermined plan of operation. One of the control members of each of the control electric valves is energized in accordance with a predetermined time relationship with the associated main electric valve, and the other control member is energized in accordance with the conductivity of the associated electric valve or in accordance with an electric quantity of an associated electric circuit.

Fig. 1 of the accompanying drawings diagrammatically illustrates an embodiment of my invention as applied to a control and indicating system in an electric valve translating circuit and Fig. 2 diagrammatically shows a modification of the control and indicating system shown in Fig. 1.

Referring now to Fig. 1 of the accompanying drawings, I have chosen to represent my invention as applied to a high voltage direct current power transmission system of the type described and claimed in U. S. Letters Patent No. 1,990,758, granted February 12, 1935 on an application of Charles W. Stone and assigned to the assignee of the present application. Briefly described, the system as shown in Fig. 1 comprises an alternating current circuit 1 of constant potential which may be energized from a suitable source of alternating current such as a synchronous generator 2. A monocyclic network 3 including a plurality of reactances of opposite sign serves to transform the alternating current of constant potential to alternating current of constant value.

A circuit interrupter 4 may be interposed between the monocyclic network 3 and the alternating current circuit 1. To change the alternating current of constant value to direct current of constant value, a full wave rectifier 5 including electric valves 6 to 11, inclusive, is used. Electric valves 6 to 11 are preferably of the type employing ionizable mediums such as gases or vapors. An inverter circuit 12, comprising electric valves 13 to 18, inclusive, preferably of the type employing an ionizable medium, serves to change the direct current of constant value to alternating current of constant value. Current smoothing reactors 19 may be connected between the rectifier 5 and the inverter 12. A monocyclic network 20 is provided to transform the alternating current of constant value to alternating current of constant potential and may be connected to an alternating current circuit 21 of constant potential, through a circuit interrupter 22 having a trip mechanism 23. A dynamo-electric machine 24 may be connected to the alternating current circuit 21 to supply energy to the alternating current circuit 21 or to be energized from the alternating current circuit 21. Conductors 25, which carry alternating current of constant value, connect the inverter 12 to the monocyclic network 20. A control or excitation circuit 26 is provided to control the inverter 12. The control circuit 26 is connected to the alternating current circuit 21 through any conventional phase shifting device such as the rotary phase shifter 27. Transformers 28 are employed in the excitation circuit 26 to render the electric valves, in the inverter circuit 12, alternately conductive and non-conductive in the proper sequence. Suitable sources of biasing potential, such as batteries 29, serve to impress a negative biasing potential on control members of electric valves 13 to 18 inclusive.

In order to provide a means for controlling the electric valve translating circuit when electric valves 13–18, inclusive, depart from a predetermined mode or plan of operation, or to afford an indication or record of the first of these electric valves to depart from the predetermined plan or mode of operation of several valves so failing within a very short period, I provide a control or indicating circuit 30. The indicating circuit 30 comprises a plurality of pairs of serially-connected electric valves 31, 32; 33, 34; 35, 36; 37, 38; 39, 40; and 41, 42. Each of these pairs of electric valves is associated with and serves to indicate an operating condition or a condition of conductivity of electric valves 13–18, respectively. For example, serially-connected electric valves 31 and 32 are associated with electric valve 13 and serially-connected electric valves 33 and 34 are associated with electric valve 16. In like manner, serially-connected electric valves 35 and 36 are associated with electric valve 14 and serially-connected electric valves 37 and 38 are associated with electric valve 17. To provide an indication or record of the operation of the respective pairs of serially connected electric valves and hence to afford an indication or record of the irregular operation of electric valves 13–18, I employ any suitable means such as the current responsive devices 43, 44, 45, 46, 47 and 48, each of which is associated with a different pair of serially-connected electric valves. Each of the current responsive means 43–48 includes an actuating element 49, a spring-biased armature 50, a co-operating contact 50' and an indicator or recorder 51. The control or indicating circuit 30 may be energized from any suitable source of direct current 52 through a switch 53.

The various pairs of serially-connected electric valves and their associated current responsive means are connected in parallel relation. A resistance 54 is employed to connect the cathodes of electric valves 32, 34, 36, 38, 40 and 42 to the control circuits for these valves. A resistance 55 and the resistance 54 are connected in series relation and are connected across the direct current source 52 and function as a voltage divider to impress negative biasing potentials on the control members of electric valves 32, 34, 36, 38, 40 and 42.

A control or excitation circuit 56, which may be energized from any suitable source of alternating potential such as the alternating current circuit 21 through any conventional phase shifting circuit 57, is employed to control the conductivity of electric valves 31, 33, 35, 37, 39 and 41 so that these electric valves are maintained non-conductive during the intervals in which the respective electric valves 13–18 are normally conductive. This phase and time relationship may be obtained by the proper adjustment of the phase shifter 57. Transformers 58 serve to energize the control members of electric valves 31, 33, 35, 37, 39 and 41. In order to control the conductivity of electric valves 32, 34, 36, 38, 40 and 42 so that these electric valves are rendered conductive only during the intervals in which electric valves 13–18, respectively, actually conduct current, I employ an excitation circuit 59 which is energized in accordance with the current flowing in conductors 25 by means of any suitable current responsive means such as the current transformers 60, 61 and 62. Transformers 63 are employed to energize the control members of electric valves 32, 34, 36, 38, 40 and 42.

In those applications where it is desirable to effect an interruption of the electric valve translating circuit when the electric valve system departs from the predetermined manner of operation, such as the condition in which one of the electric valves loses control and the electric valve conducts current at any time other than during the predetermined intervals, I provide a switch means 64 and a circuit 65 which serve to connect the operating mechanism 23 of the circuit interrupter 22 in series relation with the control circuit 30 and the source of direct current 52.

The operation of the control and indicating circuit diagrammatically shown in Fig. 1 may be best explained by considering the electric valve translating circuit when circuit interrupters 4 and 22 are closed so that energy may be transmitted between the alternating current circuit 1 and the alternating current circuit 21. As will be well understood, this electric valve translating circuit will function to permit transmission of energy from the alternating current circuit 1 to the alternating current circuit 21 and the electric valves 13–18 inclusive, in the inverter circuit 12 will, under normal operation, conduct current during predetermined intervals in a predetermined sequence of operation. So long as this sequence of operation is maintained, the control and indicating circuit 30 will not be actuated. For the purpose of explaining the operation of the control and indicating circuit 30, let it be assumed that the inverter circuit 12 is operating according to the normal predetermined plan. As will be well understood by those skilled in the art, the oppositely disposed electric valves in the inverter circuit, such as for example electric valves 13 and 16, will not be conductive at the same time and the periods of conductivity of these valves will be displaced 180 electrical degrees, each of the valves conducting for a period of 120 electrical degrees. So long as this condition is maintained, the control and indicating circuit 30 will not operate.

In order to effect energization of the control or indicating circuit 30, it is necessary that both of the associated serially-connected electric valves tend to conduct current or be conductive simultaneously. By virtue of the control or excitation circuit 56, the electric valve 31, for example, which is associated with the electric valve 13 will be maintained non-conductive only during those intervals in which the electric valve 13 is normally conductive. At all other times the electric valve 31 is in a condition to conduct current. This relationship may be effected by the proper adjustment of the phase shifter 57. Electric valve 32, which is also associated with electric valve 13 through the upper conductor 25 and the current transformer 60, is arranged to be rendered conductive only during those intervals in which the electric valve 13 conducts current. At all other times the electric valve 32 is non-conductive.

Let it be assumed that the electric valve 13 departs from the predetermined mode of operation, that is, let it be assumed that the electric valve 13 loses control and conducts current in the forward direction at a time not in accordance with the predetermined intervals during which the electric valve is normally intended to conduct current. Since the electric valve 31 is controlled to be non-conductive except during the intervals of normal conduction of electric valve 13 and since the electric valve 32 will be rendered conductive by virtue of the current conducted by the electric valve 13, the current responsive element 43 will be energized to effect actuation of the indicator or recorder 51. The electric valves 31 and 32 serve to complete the circuit including the positive terminal of the direct current source 52, the switch 53, armature 50 and indicating element 51 of current responsive device 43, electric valve 31, electric valve 32, resistance 54, switching mechanism 64 and the negative terminal of the direct current source 52. Upon energization of the actuating element 49 of the current responsive device 43, the armature member 50 will be attracted to effect an interruption of the above described circuit at the contact 50' so that the control and indicating circuit 30 is immediately reset. The armature 50 will be moved to the position shown in the drawings by the associated spring. In this manner, it will be apparent that the control and indicating circuit 30 affords an indication that the electric valve 13 has lost control. If it is desired to effect an interruption of the translating circuit, the switching mechanism 64 may be moved to the lower closed position so that the trip mechanism 23 of the circuit interrupter 22 is energized through the circuit 65 upon completion of the circuit through the serially-connected electric valves 31 and 32.

A further feature of the control and indicating circuit 30 is the arrangement of this circuit by virtue of which there is indicated that electric valve of the group 13-18, inclusive, which is the first to lose control. Since the current responsive devices 43-48 are electro-mechanical in construction and arrangement, it will be understood that these devices have a certain appreciable time delay so that in the event more than one of the electric valves in the group 13-18, inclusive, lose control, the control and indicating circuit 30 will afford an indication of the electric valve which is the first to depart from the predetermined mode of operation. This operation is accomplished by means of the resistance 54 which is connected in series relation with the various pairs of serially-connected electric valves. During the interval in which one of the pairs of serially-connected electric valves is conducting current, for example electric valves 31 and 32, the current which flows through these valves effects a decrease in the voltage impressed between the anodes and the cathodes of electric valves 34, 36, 38, 40 and 42 so that the second and subsequent main electric valves to lose control will not effect operation of the control and indicating circuit 30. Of course, after the circuit has been interrupted and reset by the current responsive device 43, any subsequent electric valve to lose control will be selectively indicated by the circuit 30. Since the interval in which successive failures of this type occur is of relatively short duration as compared with the time delay of the current responsive devices 43-48, inclusive, the control and indicating circuit 30 will indicate the first electric valve of the group 13-18, inclusive, which has lost control. It is to be noted that the electric valve means of control circuit 30 are also responsive to the direction of current transfer through the electric valve means 13-18, inclusive.

A further desirable feature to be pointed out in connection with my invention is the time or phase co-ordination whereby there is afforded this selective indication of the irregular operation of electric valves in an electric valve translating circuit. By controlling the phase of the potentials impressed on the control members of electric valves 31, 33, 35, 37, 39 and 41 to render these valves conductive at all times except during the intervals in which the associated main electric valve is normally conductive, I provide an arrangement whereby irregular operation of the valves in an electric valve translating circuit may be selectively indicated or controlled. While for the purpose of explaining my invention, I have represented my invention as applied to a particular type of electric power transmission system, it should be understood that my invention in its broader aspects may be applied to electric systems generally in which it is desired to provide a means for indicating the irregular operation of electric devices connected in the systems.

In Fig. 2 of the accompanying drawings, I have diagrammatically shown a modification of my invention in which the control and indicating circuit is provided with auxiliary or control electric valves of the type employing two control members. Otherwise, the arrangement diagrammatically shown in Fig. 2 is substantially the same as that shown in Fig. 1, and the corresponding elements have been assigned like reference numerals. A control and indicating circuit 66 includes electric valves 67-72, inclusive, which are preferably of the type employing ionizable mediums such as gases or vapors, and each comprises a control member 73 and a control member 74. The control members 73 and 74 are provided to control conjointly the conductivity of these electric valves. The electric valves may be maintained non-conductive by impressing on one of the control members a potential sufficiently negative relative to the potential of the cathode to maintain the electric valves non-conductive. The current responsive devices 43-48, inclusive, are connected in series relation with electric valves 67-72, respectively, and serve to effect the operation of the indicating or recording mechanism 51.

The operation of the control and indicating circuit 66 diagrammatically shown in Fig. 2 of the drawings is substantially the same as the operation of the control and indicating circuit 30 of Fig. 1. The control or excitation circuit 56 impresses potentials on control members 74 of electric valves 67-72, inclusive, to maintain these electric valves non-conductive only during the intervals in which the associated main power electric valves of the group 13-18, inclusive, are normally conductive. Control or excitation circuit 59 serves to impress suitable potentials on the control members 73 of electric valves 67-72 tending to render these valves conductive in accordance with the current conducted by the associated main electric valves in the group including electric valves 13-18, inclusive.

During normal operation of the electric valve inverter system 12, the control and indicating circuit 66 will not be operated and no indication will be afforded. On the other hand, if one of the main electric valves, for example electric valve 13, loses control, that is, conducts current at any time other than during the normal intervals of conduction, the valve 67 will be rendered conductive to effect energization of the current responsive device 43 from the direct current source 52. The electric valve 67 is rendered conductive by virtue of the fact that both control members 73 and 74 are energized by potentials tending to render the electric valves conductive.

The control or indicating circuit 66 also operates to afford an indication of the electric valve in the group 13-18, inclusive, which is the first to lose control. The current flowing in the control or excitation circuit through the resistance 54 when one of the electric valves of the group 67-72 is conductive, introduces an increased biasing potential which impresses on the control members 74 of these electric valves a potential sufficiently negative to cooperate with the reduced voltage appearing across resistance 55 to maintain the other electric valves non-conductive. Of course, after the current responsive device associated with the first circuit to operate is reset, subsequent irregular operation of the associated main power electric valve will be indicated or recorded by the circuit 66.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, an electric circuit, an electric valve means connected therein, means for rendering said electric valve means conductive during predetermined intervals, current responsive means, electric valve means for controlling the energization of said current responsive means and comprising two control members for conjointly controlling the conductivity thereof, means for impressing on one of said control members a potential to prevent ignition of said second mentioned electric valve means during said predetermined intervals, and means for impressing on the other of said control members a potential which varies in accordance with the actual current conducted by said first mentioned electric valve means to permit ignition of said second mentioned electric valve means and to effect energization of said current responsive means when said first mentioned electric valve means conducts current at any time other than during said predetermined intervals.

2. In combination, an electric circuit including a plurality of electric valve means connected therein, means for rendering said electric valves conductive during predetermined intervals in accordance with a predetermined plan of operation, and a circuit for indicating the electric valve means which is the first to conduct current at any time other than during said predetermined intervals comprising a plurality of electric valves each associated with a different one of said first mentioned electric valve means and each comprising two control members for conjointly controlling the conductivity thereof, means for energizing one of said control members of each of said second mentioned electric valves to render said electric valves non-conductive only during the intervals in which said associated electric valve means is normally conductive and means for energizing the other control member of each of said second mentioned electric valves in accordance with the current conducted by said associated electric valve means to cause said second mentioned electric valves to conduct current when said first mentioned electric valve means conduct current at any time other than during said predetermined intervals.

3. In combination, an electric circuit, an electric valve means connected therein, means for rendering said electric valve means conductive during predetermined intervals, a current responsive means, means for controlling the energization of said current responsive means when said electric valve means conduct current at any time other than during said predetermined intervals comprising a pair of serially-connected electric valves each having a control electrode, an excitation circuit connected to the control electrode of one of said serially-connected electric valves to prevent ignition thereof during said predetermined intervals, and an excitation circuit connected to the control electrode of the other of said serially-connected electric valves to permit ignition thereof in accordance with the current actually conducted by said first mentioned electric valve means to effect energization of said current responsive means.

4. In combination, an electric circuit, an electric valve means connected therein, means for rendering said electric valve means conductive during predetermined intervals, a source of current, current responsive means, a pair of serially-connected electric valves for controlling conjointly the energization of said current responsive means, said serially-connected electric valves each having a control member, means for impressing on the control member of one of said electric valves a periodic voltage to prevent ignition thereof during said intervals, and means connected to the control electrode of the other valve of said serially-connected valves to permit ignition thereof in accordance with the current actually conducted by said first mentioned electric valve means to effect energization of said current responsive means from said source when said first mentioned electric valve means conducts current at any time other than during said predetermined intervals.

5. In combination, an electric circuit including a plurality of electric valves connected therein, means for rendering said electric valves conductive during different predetermined intervals in accordance with a predetermined plan of operation, a control circuit, a source of potential, means for affording an indication of the first of said valves to depart from said plan of operation comprising a plurality of electric valve means each associated with a different one of said first mentioned electric valves and each comprising a pair of control members for effecting energization of said control circuit from said source when the associated first mentioned electric valve conducts current in the forward direction at any time other than during said predetermined intervals, means for impressing on one of said control members a voltage to prevent that electric valve means from conducting current during said intervals, means for impressing on the other control member a voltage to render said electric valve means conductive when the associated first mentioned electric valve actually conducts current, and means responsive to the conduction of current by said electric valve means for disconnecting its circuit from said source after a predetermined time and subsequently reclosing it.

6. In combination, an electric circuit, an electric device connected therein, means for controlling said device to conduct current in a predetermined direction during predetermined intervals and arranged to be nonconductive during other predetermined intervals in accordance with a predetermined mode of operation, a second circuit, a unitary electric valve means for energizing said second circuit comprising a pair of control members for conjointly controlling the energization of said second circuit, means for impressing on one of said control members a voltage to prevent the electric valve means from starting during said first mentioned intervals, and means for impressing on the other control member a voltage tending to render said electric valve means conductive when said device conducts current.

7. In combination, means for indicating the first of a series of rapidly occurring events comprising a plurality of electric discharge valve means connected across a common source of potential, normally inactive discharge initiating means associated with said valve means, means for energizing said discharge initiating means upon the occurrence of each event, means dependent on the discharge of one of the valve means for reducing the voltage below the necessary starting voltage of the valve means, and means responsive to the discharge of one of the valves for disconnecting its circuit from the source after a predetermined time and subsequently reclosing its circuit.

CLODIUS H. WILLIS.